United States Patent Office 3,304,294
Patented Feb. 14, 1967

3,304,294
PROCESS FOR ACYLATION OF ALKENYL
AROMATIC POLYMERS
Frederick C. Leavitt, Midland, Mich., and Priscilla A. Carney, Madison, Wis., assignors to The Dow Chemical Company, Midland, Mich., a corporation of Delaware
No Drawing. Filed Feb. 24, 1964, Ser. No. 347,063
13 Claims. (Cl. 260—93.5)

This invention relates to a process for the acylation of alkenyl aromatic polymers. More specifically it relates to a process of acylation of such polymers in a solid state.

Generally, in order to control the degree of acylation and various side reactions, it is necessary to have the material being acylated in solution so as to dilute this reagent and thereby avoid undesired side reactions.

As pointed out in two co-pending applications filed by one of the present inventors, namely co-pending applications Serial No. 198,709, filed May 31, 1962 issued November 23, 1965 as Patent No. 3,219,644, and Serial No. 221,353, filed September 4, 1962 now abandoned, it is desirable to have pendant vinyl keto groups extending from the aromatic nuclei of an alkenyl aromatic polymer, such as polystyrene. Such vinyl keto groups are desirable for effecting crosslinking and various other post treatments of the alkenyl aromatic polymer. The processes of these co-pending applications are advantageously carried out in solvents, preferably carbon disulfide.

Since the dissolving of the alkenyl aromatic polymer in the solvent and the subsequent removal of the solvent for recovery of the polymeric product involves expensive, time-consuming and often dangerous chemicals, it would be desirable to effect the acylation upon the polymer in the form in which it is available and in which it is often subsequently used. This is particularly desirable in view of the fact that there are only a limited number of solvents in which the acylation can be executed, such as carbon disulfide which is very toxic and relatively expensive.

In accordance with the present invention, it has now been found possible to effect acylation with certain acylating agents by careful control of conditions on an alkenyl aromatic polymer so as to avoid or at least minimize undesirable side reactions such as crosslinking. The acylating agents used in the practice of this invention are either of a type containing a vinyl keto group therein or one containing groups which can be ultimately converted to vinyl keto groups. The acylating agents include acrylyl chloride, methacrylyl chloride, alpha- and beta-chloro-propionyl chloride, alpha-chloro and beta-chloro-alpha-methyl-propionyl chloride and the corresponding compounds in which one or both of the chlorine atoms are replaced by bromine, fluorine or iodine.

An important feature of the control of the acylation reaction is the temperature range in which the reaction is effected. By keeping the temperature below 100° C. side reactions from most of the acylating compounds are avoided, or at least considerably minimized. With the more reactive acylating agents, the temperature is desirably kept below 80° C. The acylation will proceed at a temperature as low as 0° C. but it is more practical and faster reaction is effected by starting at at least room temperature. The preferred procedure is to have the reagents at room temperature at the beginning of the reaction and to allow the ambient temperature not to exceed 80° C. preferably not greater than 60° C. Since the reaction is exothermic, it is sometimes necessary to use cooling means to maintain a sufficiently low temperature.

When acrylyl chloride and methacrylyl chloride are used it is generally preferable to use a temperature below 60° C. so as to minimize or avoid polymerization through the unsaturated groups. With the acylating agents which have alpha or beta halogen atoms instead of unsaturation therein, there is the possibility of having alkylation proceed through displacement of the halogen atom other than the acyl halide. This is likewise controlled by maintaining the relatively low temperatures described herein. The temperature desirable for effecting acylation is a lower temperature than the temperature at which alkylation proceeds either through the alpha or beta halogen atom or through the unsaturated group. Therefore, the acylation is selectively permitted by maintaining the temperature below those at which substantial alkylation or polymerization will occur.

The acylation process of this invention comprises the step of making an intimate mixture of an alkenyl aromatic polymer in dry powder form and an anhydrous powdered acylation catalyst and thereafter passing through said intimate mixture a vaporized acylating agent at a temperature in the range of 0–100° C. for a period sufficient to effect a substantial amount of acylation of said alkenyl aromatic polymer. The alkenyl aromatic compound used in making the polymer has at least four aromatic nuclear positions unsubstituted.

Since the boiling point of some of the acylating agents is higher than the temperature desired to avoid the undesired side reactions, vaporization of the acylating agent for the passage of its vapors through the reaction mass can be effected by reducing the pressure sufficiently so that the acylating agent boils at a temperature low enough to be within the desired temperature range. The pressure reduction is effected at a point on the opposite side of the reaction mass from the source of acylating agent so that as the vapors are formed they pass through the reaction mass and effect the acylation. A condenser or cold trap is advantageously placed between the reaction zone and the pressure reducing means so that unreacted acylating agent vapor can be condensed and recovered.

In some cases it is desirable to dilute the acylating vapors with an inert gas such as nitrogen, methane, argon, etc. It is also possible to effect reaction by blowing an inert gas through a liquid acylating agent and thereby pick up enough vapor to pass through the reaction mass without the application of reduced pressure. In such cases it is possible to use the stream of gas as an agitating means to keep the reaction mixture in gas suspension.

It might be expected that, in passing the acylating vapor through a bed of the powdered resin and catalyst mixture, the lower or entrance region of the bed would be more highly acylated since it comes into more prolonged contact with the acylating agent. However, it is found that the uniform distribution of the acylation catalyst through the mass has a controlling effect since the catalyst in the lower or entrance region becomes spent and eventually the acylating agent passes through such areas of spent catalyst without effecting further acylation therein. Consequently the acylating agent eventually is capable of effecting acylation in regions farther along its path.

The alkenyl aromatic preformed polymers used as the starting material for attachment of the above pendant groups by the acylation described herein are represented by the formula $$CH_2=C(R'')-Ar$$

wherein $R''$ represents hydrogen, and lower alkyl groups, preferably methyl, ethyl, etc. Therefore, the starting polymer has a plurality of repeating units therein of the formula

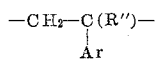

Polystyrene is preferred in the practice of this invention, but other polymers of alkenyl aromatic compounds can be used, preferably those in which the aromatic ring has no substitution or a small amount of substitution, in addition to the alkenyl group. Other substituents on the aromatic ring can include, but are not limited to, various aliphatic, cycloaliphatic and aromatic hydrocarbon groups, preferably of no more than about 8 carbon atoms, halogen, e.g. Cl, F, Br and I, etc.

Typical alkenyl aromatic compounds that can be used include, but are not restricted to, polymers of the following: styrene, α-methylstyrene, α-ethylstyrene, various derivatives of styrene having the substituent groups attached to the aromatic nucleus, such as methyl styrene, ethyl styrene, propyl styrene, butyl styrene, heptyl styrene, octyl styrene, and the corresponding derivatives of α-methyl styrene, α-ethylstyrene, etc., chloro styrene, cyanomethyl styrene, etc., preferably with the nuclear substituent group of the preceding compounds in a position other than para to the alkenyl group, vinyl naphthalene, isopropenyl naphthalene, vinyl methyl naphthalene, vinyl ethyl naphthalene, vinyl dimethyl naphthalene, vinyl hexyl naphthalene, vinyl diethyl naphthalene, isopropenyl diphenyl, vinyl methyl diphenyl, vinyl butyl diphenyl, vinyl choro naphthalene, vinyl cyano naphthalene, vinyl cyanoethyl naphthalene, isopropenyl bromo naphthalene, vinyl chloro diphenyl, isopropenyl cyano diphenyl, isopropenyl fluoro diphenyl, etc.

As indicated above, various copolymers of alkenyl aromatic compounds are also included for use in the practice of this invention. In such cases it is desirable to have at least 5% of the alkenyl aromatic monomer contained in the copolymer so as to provide sufficient aromatic nuclei which can be acylated to provide a desired amount of crosslinking groups, preferably at least 20%, particularly where the comonomer may have substituents therein which retard or interfere with the acylation. In some cases it may be desirable to use copolymers of one alkenyl aromatic group having no substituents or no more than one substituent on the aromatic nucleus, and as the comonomer an alkenyl aromatic monomer having a high degree of substitution thereon, in which case the latter monomer does not have positions easily available for acylation. In such case it is desirable to use copolymers of monomer mixtures having at least 5% of the unsubstituted or substituted alkenyl aromatic compound having one substituent group other than the alkenyl group.

Generally, however, it is preferred to use at least 20% of an alkenyl aromatic compound having a number of positions available for acylation even though it is not intended, or possibly desired, to substitute an acyl group on each of such nuclei.

In addition to various alkenyl aromatic compounds having a high degree of substitution thereon of the groups indicated above, it is also desirable in many cases to use other modifying comonomers in conjunction with the unsubstituted or monosubstituted alkenyl aromatic compounds. Preferred comonomers are those which are not reactive with or reacted on by the $AlCl_3$. Typical preferred comonomers, in addition to the various alkenyl aryl compounds listed above are ethylene, propylene, butenes, butadiene, isoprene, vinyl ethyl ether, acrylonitrile, methyl methacrylate, etc.

Molecular weights of no less than 3000 are generally preferred, although in some cases where a high degree of acylation is to be effected with the result that the molecular weight will be multiplied considerably upon crosslinking, even a lower molecular weight can often be used. There is no upper limit on the molecular weight of the polymers that can be used. With higher molecular weights such as 150,000 or higher, the number of acyl groups to be introduced to produce insolubility and infusibility upon crosslinking, is obviously much smaller than is the case where lower molecular weight polymers are used.

While it is generally preferred to have a linear, soluble polymer as the preformed starting polymer, it is also desirable in some cases to apply the present invention to crosslinked, insoluble polymers where it is desired to effect the substitution of vinyl keto groups on a limited portion of the starting polymer. For example, beads, pellets, and particles of such crosslinked, insoluble polymers can be used and the acylation and dehydrohalogenation reactions effected on the surface of the beads, pellets, particles or other shape of the starting polymer. Typical cross-linked insoluble polymers which can be used for this purpose are those polymers of alkenyl aromatic compounds as listed above, which have been copolymerized with minor amounts of difunctional monomers such as divinyl benzene, divinyl toluene, divinyl naphthalene, divinyl diphenyl, diisopropenyl benzene, ethylene glycol diacrylate, divinyl diphthalate, etc.

The following examples illustrate the practice of this invention but are not intended to restrict in any way the scope or the manner in which the invention can be practiced. Parts and percentages are by weight.

*Example I*

A mixture of 2 parts of finely powdered polystyrene of a molecular weight of 15,000 and 0.4 part of powdered, anhydrous $AlCl_3$ is tumbled in a tightly covered, moisture-free container for approximately 30 minutes. The mixture is then placed in a glass tube of 0.5 inch inside diameter with glass wool plugs at both ends. A flask containing 0.55 parts of acrylyl chloride is attached by a ground glass adaptor to the tube fixed in a horizontal position. The opposite end of the tube is fitted with a reduced pressure take-off and a round bottom flask for collecting excess acid chloride. Reduced pressure from a water aspirator is applied to distill the acid chloride through the packed column. After ten minutes, the entire length of the column shows a red-orange color of acid chloride-catalyst complex. The vacuum is then discontinued and the polymer is removed from the column and placed in a dilute solution of ice-cold aqueous HCl. The mixture is slurried for several minutes, and then the polymer is filtered off and dried. An IR spectra of the product shows a strong carbonyl peak at 5.94. The peak intensity indicates a D.S. of greater than 15. D.S. is defined as the number of substituents per 100 monomer units.

*Example II*

The procedure of Example I is repeated except that the polymer-catalyst mixture is placed in a vertical tube and the acid chloride is carried through the tube by a stream of nitrogen fed into the bottom of the flask. The rate of flow of nitrogen gas is adjusted and enough space left in the tube so that the polymer-catalyst powders are kept in constant motion and dispersed throughout the length of the tube. After approximately 20 minutes the polymer mixture is bright orange in color. The nitrogen flow is then discontinued and the polymer hydrolyzed according to the above procedure. Upon analysis as in Example I similar properties are determined.

*Example III*

The procedure of Example I is repeated a number of times and in place of the polystyrene equivalent amounts of the following polymers respectively are used: polyvinyl toluene, α-methyl styrene, vinyl naphthalene, o-chloro styrene, meta-cyanomethyl styrene, vinyl ethyl naphthalene, vinyl diphenyl, 50–50 copolymer of styrene-α-methyl styrene, 50–50 styrene-vinyl toluene and 50–50 styrene-ethylene. In each case similar acylation is effected. Upon exposure to high energy radiation as well as to free radical generating catalysts, namely peroxy compounds, etc. such as, for example, benzoyl peroxide, t-Bu hydroperoxide, di-t-Bu diperphthalate, t-Bu perbenzoate, etc. the respective products are crosslinked to hard, insoluble, infusible masses.

*Example IV*

The procedure of Example I is repeated, using in place of the acrylyl chloride, an equivalent amount of β-chloro propionyl chloride, α-chloro propionyl chloride, β-bromo propionyl bromide, α-fluoro propionyl chloride, α-iodo propionyl chloride and α-fluoro propionyl bromide, respectively. In each case, acylation is similarly effected. Each acylated product is subsequently dehydrohalogenated by reaction with potassium acetate to give the corresponding acrylyl derivative which is eventually crosslinked to an insoluble infusible product as in Example III.

*Example V*

The procedure of Example I is repeated using 0.45 part of powdered, anhydrous AlBr₃ in place of the AlCl₃. Similar results are obtained as in Example I. Corresponding results are also obtained when the procedures of Examples II–IV are repeated using equivalent amounts of AlBr₃ in place of the AlCl₃.

While, as shown in Example V, aluminum bromide can be used in place of the aluminum chloride, aluminum chloride is preferred. When aluminum bromide is used, it is desirable to avoid temperatures of more than about 95° C.

Preferred acylating agents for the practice of this invention are the acrylyl halides and the alpha and beta-halo propionyl halides. These can be represented by the formulas:

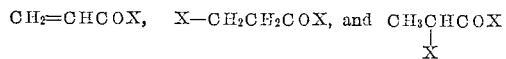

The X represents a halogen atom, namely chlorine, bromine, iodine or fluorine. The compounds having two halogen atoms can have identical or different halogen atoms. Preferably the halogen is chlorine or bromine.

Some of these acylating agents are commercially available but all of them can be prepared easily by well-known reactions. For example, the various acrylyl halides can be prepared by conversion of acrylic acid to the corresponding acrylyl halide by reaction with an inorganic acid halide such as thionyl halide, e.g. thionyl chloride, etc. The acylating agents having two halogen atoms therein can be prepared either by starting with the α or β halogen-propionic acid and converting its acid group to the acid halide as described, or an acrylyl acid halide can be converted to α or β halogen-substituted propionyl halide. For example, the β halogen substituted propionyl halide is prepared by HX addition to an acrylyl halide. The α halogen substituted derivatives are prepared by direct halogenation of the corresponding propionyl halide.

The polymer derivatives in which the acylated product still contains chlorine, for example in the alpha or beta position of the propionyl group, can be converted to vinyl keto groups by treatment of this product with KOH or with potassium acetate as indicated in Example IV to give the corresponding acrylyl derivative.

While certain features of this invention have been described in detail with respect to various embodiments thereof, it will, of course be apparent that other modifications can be made within the spirit and scope of this invention, and it is not intended to limit the invention to the exact details shown above except insofar as they are defined in the following claims.

The invention claimed is:

1. The process for solvent-free acylation of an aromatic polymer comprising the steps of blending a dry powder of the aromatic polymer with an anhydrous powdered acylation catalyst selected from the class consisting of aluminum chloride and aluminum bromide to form an intimate mixture thereof, thereafter passing through said intimate mixture a vaporized acylating agent and retaining said three components in admixture at a temperature in the range of 0–100° C. for a period sufficient to effect acylation of said aromatic polymer, said aromatic polymer being selected from the class consisting of polymers of an alkenyl aromatic compound having at least four aromatic nuclear positions unsubstituted, and said acylating agent having a formula selected from the class consisting of:

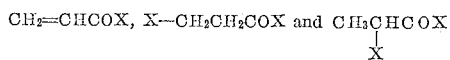

wherein X represents an halogen atom.

2. The process of claim 1 in which said temperature is in the range of 20–80°C.

3. The process of claim 1 in which said temperature is in the range of 20–60° C.

4. The process of claim 1 in which said polymer is polystyrene.

5. The process of claim 4 in which said powdered acylation catalyst in anhydrous aluminum chloride.

6. The process of claim 4 in which said acylation catalyst is anhydrous aluminum bromide.

7. The process of claim 1 in which said acylation catalyst is aluminum chloride.

8. The process of claim 1 in which said acylation catalyst is aluminum bromide.

9. The process of claim 1 in which said polymer is polystyrene, said acylation catalyst is anhydrous aluminum chloride and said temperature is in the range of 20–80° C.

10. The process of claim 1 in which said polymer is polystyrene, said acylation catalyst is anhydrous aluminum bromide and said temperature is in the range of 20–80° C.

11. The process of claim 1 in which said acylating agent is acrylyl chloride.

12. The process of claim 1 in which said acylating agent is β-chloro-propionyl chloride.

13. The process of claim 1 in which said acylating agent is α-chloro-propionyl chloride.

References Cited by the Examiner

UNITED STATES PATENTS 1,898,687    2/1933    Rice _____ 260—691
2,566,302    9/1951    Allen et al. _____ 260—93.5
2,642,398    6/1953    Butler _____ 260—93.5

JOSEPH L. SCHOFER, *Primary Examiner.*

JAMES A. SEIDLECK, *Assistant Examiner.*